Patented Aug. 12, 1947

2,425,416

UNITED STATES PATENT OFFICE 2,425,416

PREPARATION OF ISOPARAFFINS

Donald C. Bond, Northbrook, and Michael Savoy, Chicago, Ill., assignors to The Pure Oil Company, Chicago, Ill., a corporation of Ohio No Drawing. Application October 3, 1945,
Serial No. 620,186

10 Claims. (Cl. 260—676)

This invention relates to a method of preparing isoparaffins from olefins, and is more particularly concerned with the process of converting ethylene into isobutane.

An object of the invention is to provide a method for preparing isoparaffins from olefinic hydrocarbons.

Another object of the invention is to provide a method for converting ethylene into isobutane.

Still another object of the invention is to provide a method for simultaneously preparing alkyl halides and isoparaffins from olefinic hydrocarbons.

A still further object of the invention is to provide a process for simultaneously preparing ethyl chloride and isobutane.

Other objects of the invention will become apparent from the following description.

We have discovered that olefins can be converted into isoparaffins by contacting the olefin with anhydrous zirconium tetrachloride in the presence of hydrogen chloride, and that by properly proportioning the hydrogen chloride and ethylene charged to the process, the chief reaction product of the reaction will be isobutane, with lesser amounts of ethyl chloride and C₅ and other hydrocarbons.

The volume ratio of hydrogen chloride to ethylene should be maintained between approximately 0.15 and 0.50. Test yields of isobutane based on the ethylene charged are obtained within the volume ratio of hydrogen chloride to ethylene of approximately 0.20 to 0.40. When the ratio of hydrogen chloride to ethylene exceeds 0.4, ethyl chloride becomes the major reaction product with correspondingly smaller yields of isobutane. Likewise, when the ratio of hydrogen chloride to ethylene is below 0.2, conversion of ethylene to isobutane is small as compared to ethyl chloride yield. We prefer to maintain the volume ratio of hydrogen chloride to ethylene at approximately 0.25 since it is our experience that with this ratio highest yields of isobutane, with corresponding lower yields of ethyl chloride, are obtained. The reaction is conducted at temperatures of approximately 250° to 570° F. under atmospheric pressure and at somewhat higher temperatures where superatmospheric pressure sufficient to prevent sublimation of the catalyst is used. We prefer to use zirconium chloride impregnated on a solid carrier such as activated alumina, fuller's earth, active carbon, or diatomaceous earth. The reactants may be contacted for a period of time varying over a wide range. We have found that a period of contact between reactants and catalyst of approximately 1.5 to 10 minutes, or stated differently, a space velocity of approximately 5 to 100, gives good results. By "space velocity" is meant the total volume at standard temperature and pressure of gas passed per hour through the catalyst divided by the volume occupied by the catalyst.

Instead of starting with fresh zirconium tetrachloride as catalyst, zirconium tetrachloride-olefin complex may be used. It is advantageous when using fresh zirconium tetrachloride to soak the catalyst in hydrogen chloride before passing the olefin therethrough, since the catalyst is relatively inactive until soaked in an atmosphere of hydrogen chloride. We have found that when the catalyst is soaked in hydrogen chloride for a period of approximately 1 to 4 hours at reaction temperature the catalyst will attain a high level of activity.

The catalyst becomes deactivated during the course of use with the result that the yield of isobutane gradually decreases and the yield of ethyl chloride increases.

In order to demonstrate our invention a series of runs in a laboratory experimental apparatus were made using ethylene as the olefin charging gas. The catalyst used in all the runs was prepared by mixing 375 cc. of 8 to 14 mesh "Celite" (the trade-name for a diatomaceous earth which has been specially treated to make it porous), and 113 grams of zirconium tetrachloride. The mixture was placed in a glass-lined autoclave and hydrogen chloride equal to 1% by weight of the zirconium tetrachloride introduced to the autoclave. The pressure in the autoclave was raised to 300 pounds per square inch by means of hydrogen, and the contents of the autoclave were heated to a temperature of 662° F. for 4 hours. The catalytic reactor used in making the runs had a capacity of 375 cc. The results obtained in the runs are tabulated in the following table:

Table

| Run No. | 1 | 2 | 3 | 4 | 5 | 6 | 7 | 8 | 9 | 10 | 11 |
|---|---|---|---|---|---|---|---|---|---|---|---|
| Catalyst | Fresh | From Run 1 | From Run 2 | From Run 3 | From Run 4 | Fresh | From Run 6 | From Run 7 | Fresh | Fresh | Fresh |
| Temp., °F | 370 | 370 | 470 | 470 | 470 | 355 | 355 | 355 | 360 | 360 | 360 |
| Cu. ft. HCl/hr | 0.10 | 0.10 | 0.10 | 0.10 | 0.10 | 0.20 | 0.20 | 0.20 | 0.05 | 0.25 | 0.00 |
| Cu. ft. $C_2H_4$/hr | 0.41 | 0.36 | 0.41 | 0.36 | 0.40 | 0.40 | 0.41 | 0.40 | 0.50 | 0.26 | 0.47 |
| Vol. Ratio HCl:$C_2H_4$ | 0.25 | 0.27 | 0.24 | 0.27 | 0.25 | 0.53 | 0.49 | 0.50 | 0.099 | 1.00 | -------- |
| Space Velocity | 38.3 | 35.0 | 38.5 | 34.5 | 37.8 | 44.9 | 46.0 | 45.0 | 41.8 | 37.8 | 35.3 |
| Contact Time, min | 1.56 | 1.71 | 1.55 | 1.70 | 1.58 | 1.34 | 1.30 | 1.33 | 1.43 | 1.58 | 1.70 |
| Duration of run, hrs | 2.83 | 2.91 | 3.91 | 4.90 | 3.25 | 3.08 | 1.90 | 2.50 | 3.00 | 3.83 | 4.11 |
| Cc. liquid collected | 40.0 | 34.0 | 50.0 | 54.0 | 34.5 | 34.5 | 8.0 | 9.5 | 16.0 | 53.0 | 1.0 |
| Partial Analysis of liquid: | | | | | | | | | | | |
| % $C_2H_5Cl$ | 45.6 | 47.5 | 49.5 | 78.4 | 87.5 | 79.6 | 82.5 | 85.4 | 77.8 | 87.9 | (²) |
| % iso-$C_4H_{10}$ | 28.4 | 25.2 | 21.9 | 10.1 | 2.9 | 3.5 | 4.5 | ∠1.2 | 5.3 | 5.4 | (²) |
| % n-$C_4H_{10}$ | 0.0 | -------- | 1.1 | 1.8 | 0.0 | 0.2 | 0.1 | -------- | 0.4 | 0.0 | (²) |
| % $C_5$-Hyd | 1.4 | -------- | 2.8 | 0.6 | 0.2 | 0.3 | 0.4 | 0.3 | 0.4 | 0.1 | (²) |
| % $C_5$-Hyd | 13.6 | -------- | 8.8 | 1.7 | 2.0 | 4.2 | 1.1 | 2.0 | 5.7 | 0.0 | (²) |
| gm. $C_2H_5Cl$ | 16.0 | 12.9 | 22.9 | 34.8 | 30.2 | 28.0 | 6.1 | -------- | 12.1 | 49.0 | (²) |
| gm. iso-$C_4H_{10}$ | 9.0 | 7.0 | 11.2 | 4.0 | 0.9 | 1.2 | 0.4 | -------- | 0.7 | 2.7 | (²) |
| % yield iso-$C_4H_{10}$ based on $C_2H_4$ charged | 21.3 | 20.9 | 11.1 | 6.2 | 1.8 | 2.6 | 0.6 | -------- | 1.3 | 7.6 | (²) |
| % yield $C_2H_5Cl$ based on $C_2H_4$ charged | 17.1 | 15.0 | 17.6 | 24.3 | 28.5 | 28.5 | 9.5 | -------- | 9.9 | 61.8 | (²) |
| % yield $C_2H_5Cl$ based on HCl charged | 69.7 | 55.5 | 72.2 | 90.0 | ¹ 115 | 53.8 | 19.4 | -------- | 100.0 | 61.8 | (²) |

¹ Due to HCl from catalyst.   ² Not analyzed.

From an examination of the table it will be seen that in run No. 1 where the volume ratio of hydrogen chloride to ethylene was approximately 0.25, the yield of isobutane on the basis of ethylene charged was 21.3% and the yield of ethyl chloride on the basis of olefins was 17.1%. In this run a considerable quantity of $C_5$ carbon was formed. In run 2 using the catalyst from run 1 the yields of both isobutane and ethyl chloride dropped to a small extent, but the yield of isobutane was still above the ethyl chloride yield. In run 3 the catalyst was beginning to become exhausted and the yield of isobutane dropped to 11.1%, whereas the yield of ethyl chloride increased to 17.6%. This tendency of the isobutane yield to decrease and the ethyl chloride to increase continued through runs 4 and 5.

Run 6 shows the effect of increasing the hydrogen chloride to olefin ratio to 0.5. A low yield of isobutane is obtained, with a comparatively high yield of ethyl chloride.

Run 7 merely shows the falling off of activity of the catalyst from run 6 upon continued use. It is interesting to note that the catalyst fell off more rapidly in runs 6 and 7 than in runs 1 to 5.

Run 8 shows that the production of isobutane has decreased considerably from the preceding run 7 upon further use of the catalyst.

Run 9 demonstrates the effect of decreasing the ratio of hydrogen chloride to ethylene below 0.2. In this run in which the ratio was 0.1, the yield of isobutane based on olefin was only 1.3 as against a yield of 100% of ethyl chloride.

Run 10 was made with a ratio of hydrogen chloride to ethylene of approximately 1.0. Here again, the yield of ethyl chloride based on ethylene charged is far in excess of the isobutane yield.

Run 11 was made to show the effect of the catalyst on isobutane with no hydrogen chloride present. The yield of liquid obtained was so small (1.0 cc.) that it was not analyzed. Comparing this yield of liquids with the yields obtained in the previous runs it is apparent that there was very little reaction of ethylene to higher-boiling compounds.

The length of any particular run will depend upon economic conditions such as requirements of isobutane and the market for ethyl chloride. It was previously pointed out that in the course of the reaction, in addition to ethyl chloride and isobutane, $C_5$ and higher boiling products, as well as hydrocarbons having less than 4 carbon atoms are formed to a lesser extent. These products can be separated from the reaction products by fractionation.

Formation of isobutane from ethylene can be explained by the fact that the catalyst forms a zirconium tetrachloride - hydrocarbon complex containing less hydrogen than is present in ethylene. Regardless of the theory accounting for the formation of isobutane, we believe that we are the first to have discovered that isobutane can be obtained in large yields from ethylene by contacting it with anhydrous zirconium tetrachloride in the presence of hydrogen chloride.

It is claimed:

1. The method of preparing isoparaffin which comprises contacting ethylene with anhydrous zirconium tetrachloride at a temperature of approximately 250–570° F. in the presence of hydrogen chloride, the volume ratio of hydrogen chloride to ethylene being between 0.15 and 0.5.

2. Method in accordance with claim 1 in which the volume ratio of hydrogen chloride to ethylene is between approximately 0.2 and 0.40.

3. Method in accordance with claim 1 in which the space velocity is between 5 and 100.

4. Method in accordance with claim 1 in which the volume ratio of hydrogen chloride to zirconium tetrachloride is between approximately 0.2 and 0.4 and the space velocity is between 5 and 100.

5. The method of preparing isobutane and ethyl chloride which comprises contacting a mixture of hydrogen chloride and ethylene in the ratio of 0.15 to 0.5 volumes of the former to 1 volume of the latter, with anhydrous zirconium tetrachloride deposited on a porous carrier, at temperatures of approximately 250° to 570° F.

6. Method in accordance with claim 5 in which the carrier is diatomaceous earth.

7. Method in accordance with claim 5 in which the catalyst is soaked in an atmosphere of hydrogen chloride prior to contacting it with the ethylene-hydrochloride mixture.

8. Method in accordance with claim 5 in which the ratio is approximately 0.20 to 0.40 volumes of the former to 1 volume of the latter and the catalyst is soaked in hydrogen chloride prior to contacting it with the ethylene-hydrogen chloride mixture.

9. The method of preparing isobutane and ethyl chloride comprising contacting a mixture containing a volume ratio of hydrogen chloride to ethylene between approximately 0.20 and 0.40 with an anhydrous zirconium tetrachloride-ethylene complex at a temperature between approximately 250° and 570° F.

10. Method in accordance with claim 9 in which the complex is soaked in hydrogen chloride at reaction temperature prior to contact with the ethylene-hydrogen chloride mixture.

DONALD C. BOND.
MICHAEL SAVOY.

REFERENCES CITED

The following references are of record in the file of this patent:

UNITED STATES PATENTS

| Number | Name | Date |
|---|---|---|
| 2,355,925 | Reid | Aug. 15, 1944 |
| 2,392,454 | Bond et al. | Jan. 8, 1946 |

FOREIGN PATENTS

| Number | Country | Date |
|---|---|---|
| 466,134 | Great Britain | May 24, 1937 |

OTHER REFERENCES

Reactions of Pure Hydrocarbons, Egloff, Reinhold Pub. Co., pages 301, 302.